US009384662B2

(12) United States Patent
Choi et al.

(10) Patent No.: US 9,384,662 B2

(45) Date of Patent: Jul. 5, 2016

(54) PARKING ASSISTANCE FOR A VEHICLE

(71) Applicant: FORD GLOBAL TECHNOLOGIES, LLC, Dearborn, MI (US)

(72) Inventors: Brian Choi, Ann Arbor, MI (US); Andrew Ochmanski, Sterling Heights, MI (US); Vernon Richard Stempnik, Roseville, MI (US); Aric David Shaffer, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 233 days.

(21) Appl. No.: 14/255,181

(22) Filed: Apr. 17, 2014

(65) Prior Publication Data

US 2015/0302750 A1 Oct. 22, 2015

(51) Int. Cl.

| | |
|---|---|
| ***B60Q 1/00*** | (2006.01) |
| ***B60Q 1/48*** | (2006.01) |
| ***G08G 1/16*** | (2006.01) |
| ***G05D 1/00*** | (2006.01) |
| ***G01C 22/00*** | (2006.01) |
| ***A01B 69/00*** | (2006.01) |
| ***B60S 9/205*** | (2006.01) |
| ***G08G 1/14*** | (2006.01) |

(52) U.S. Cl.

CPC ...................................... *G08G 1/141* (2013.01)

(58) Field of Classification Search

CPC ...... G08G 1/096; B60Q 1/525; G01S 13/931; B60T 8/172; G05D 1/0272; G05D 1/0816; G06G 7/78; B62D 5/0463; B60S 9/20

USPC ......... 340/435, 932.2, 903; 701/1, 23, 8, 300, 701/41; 342/27; 180/199

See application file for complete search history.

(56) References Cited

U.S. PATENT DOCUMENTS

| | | | | |
|---|---|---|---|---|
| 6,925,370 | B2 | 8/2005 | Smith et al. | |
| 8,422,737 | B2 | 4/2013 | Scherl et al. | |
| 8,521,366 | B2 | 8/2013 | Schneider et al. | |
| 2009/0222229 | A1 | 9/2009 | Kakinami | |
| 2010/0265048 | A1* | 10/2010 | Lu | B60Q 9/005 340/435 |
| 2011/0004375 | A1 | 1/2011 | Hueger et al. | |
| 2014/0188339 | A1* | 7/2014 | Moon | B62D 15/0285 701/41 |
| 2015/0237311 | A1* | 8/2015 | Hattori | H04N 7/183 348/148 |
| 2015/0239437 | A1* | 8/2015 | Ignaczak | B60T 7/22 701/70 |

FOREIGN PATENT DOCUMENTS

| | | | |
|---|---|---|---|
| DE | 102010032462 | A1 | 2/2012 |

* cited by examiner

*Primary Examiner* — George Bugg
*Assistant Examiner* — Munear Akki
(74) *Attorney, Agent, or Firm* — LeClairRyan

(57) ABSTRACT

Parking assistance for a vehicle includes various elements directed to assessing whether a motion or position of a vehicle is conducive to detecting an available parking slot. In one instance, a signal is received, and the signal is used to calculate a movement parameter. For example, the movement parameter might include a distance between the driven vehicle and one or more objects or a passing angle of the driven vehicle relative to the one or more objects. The movement parameter is then compared to a movement parameter threshold, and a notification is transmitted when the movement parameter is violated.

14 Claims, 4 Drawing Sheets

PARKING ASSISTANCE FOR A VEHICLE

BACKGROUND

It is often challenging to determine whether a parking slot is appropriately sized for a vehicle. For example, it can be difficult for a vehicle driver to assess whether a parking slot is long enough (e.g., when parallel parking) or wide enough (e.g., when perpendicularly parking).

Parking-assistance technologies have been developed to assist with determining whether a slot is big enough for a vehicle to park. However, these technologies can be less accurate or reliable when a vehicle is too far away from the surrounding vehicles or is moving at an angle relative to the surrounding vehicles.

SUMMARY

An embodiment of the present invention is directed to a parking-assistance technology, which determines when a vehicle is being driven in a manner that might render parking-slot assessments less reliable or might eventually lead to less reliable assessments. For example, the technology might determine that a vehicle should be driven closer to parked vehicles to reduce a likelihood that less reliable assessments will be made. In addition, the technology might determine that a passing angle of the vehicle might render assessments less reliable.

In one embodiment, the invention includes computer-readable media storing computer-executable instructions that, when executed, provide a method of assessing whether motion of a vehicle is conducive to detecting an available parking slot. The method might include various steps, and in one aspect, the method includes receiving one or more signals usable to calculate a distance of the vehicle from one or more objects. Then a determination is made as to whether the distance exceeds a distance threshold, and a notification is transmitted when the distance threshold is exceeded. In another aspect, the method includes receiving one or more signals for assessing a passing angle at which the vehicle is being driven relative to one or more objects. Then a determination is made as to whether the passing angle satisfies an angle threshold, and a notification is transmitted when the angle fails to meet the angle threshold.

Another embodiment of the present invention includes a parking-assistance device for detecting an available parking slot for a vehicle. The device might include, among other elements, a sensor that receives one or more signals and that is coupled to a computing device. The computing device is configured to calculate a movement parameter that is based on the one or more signals and that describes a state of the vehicle relative to one or more objects. In addition, the computing device compares the movement parameter to a movement-parameter threshold, and transmits a notification when the movement parameter fails to satisfy the movement-parameter threshold. The device also includes a presentation device that receives the notification and provides an alert suggesting that the state of the vehicle be changed.

Embodiments of the invention are defined by the claims below, not this summary. A high-level overview of various aspects of the invention is provided here to merely introduce a selection of concepts that are further described below in the detailed-description section. This summary is not intended to identify key or essential features of the claimed subject matter, nor is it intended to be used as an aid in isolation to determine the scope of the claimed subject matter.

BRIEF DESCRIPTION OF THE DRAWINGS

Illustrative embodiments of the present invention are described in detail below with reference to the attached drawing figures, which are incorporated herein by reference, wherein.

DETAILED DESCRIPTION

The subject matter of embodiments of the present invention is described with specificity herein to meet statutory requirements. But the description itself is not intended to necessarily limit the scope of claims. Rather, the claimed subject matter might be embodied in other ways to include different elements or combinations of elements similar to the ones described in this document, in conjunction with other present or future technologies. Terms should not be interpreted as implying any particular order among or between various steps herein disclosed unless and except when the order of individual steps is explicitly stated.

Parking-assistance systems exist that can assess whether a parking slot is long enough (e.g., when parallel parking) or wide enough (e.g., when perpendicularly parking) to accommodate a vehicle. These technologies use various types of sensors, such as ultrasonic, electromagnetic, radar, visual (e.g., video with video analysis), and Lidar, to measure the environment surrounding a vehicle. For instance, parking-assist systems typically include some form of processing device or controller that is configured to make assessments based on conditions detected by the sensor. In addition, the parking-assistance system typically includes, or is connected to, some form of presentation device, such as an LED indicator, dashboard display, audible notification system, and the like. As such, the parking-assistance system might provide alerts via the presentation device to assist the driver with parking the vehicle.

Parking-assistance systems are sometimes less reliable when the vehicle being parked is driven in a manner that is less conducive to accurate scanning, sensing, and the like. For instance, parking-assistance systems are often less reliable the further the driven vehicle is away from a parked vehicle or object. In addition, parking-assistance systems can be less reliable when a passing angle of the driven vehicle (relative to the parked vehicles) is too large.

Thus embodiments of the present invention are directed to technologies for assessing whether a motion or position of a vehicle is conducive to detecting an available parking slot. In one instance, a signal is received, such as by using a sensor, and the signal is used to calculate a movement parameter. For example, the movement parameter might include a distance between the driven vehicle and one or more objects or a passing angle of the driven vehicle relative to the one or more objects. The movement parameter is then compared to a movement parameter threshold, and a notification is transmitted when the movement parameter (e.g., condition) is violated.

Figure 1:
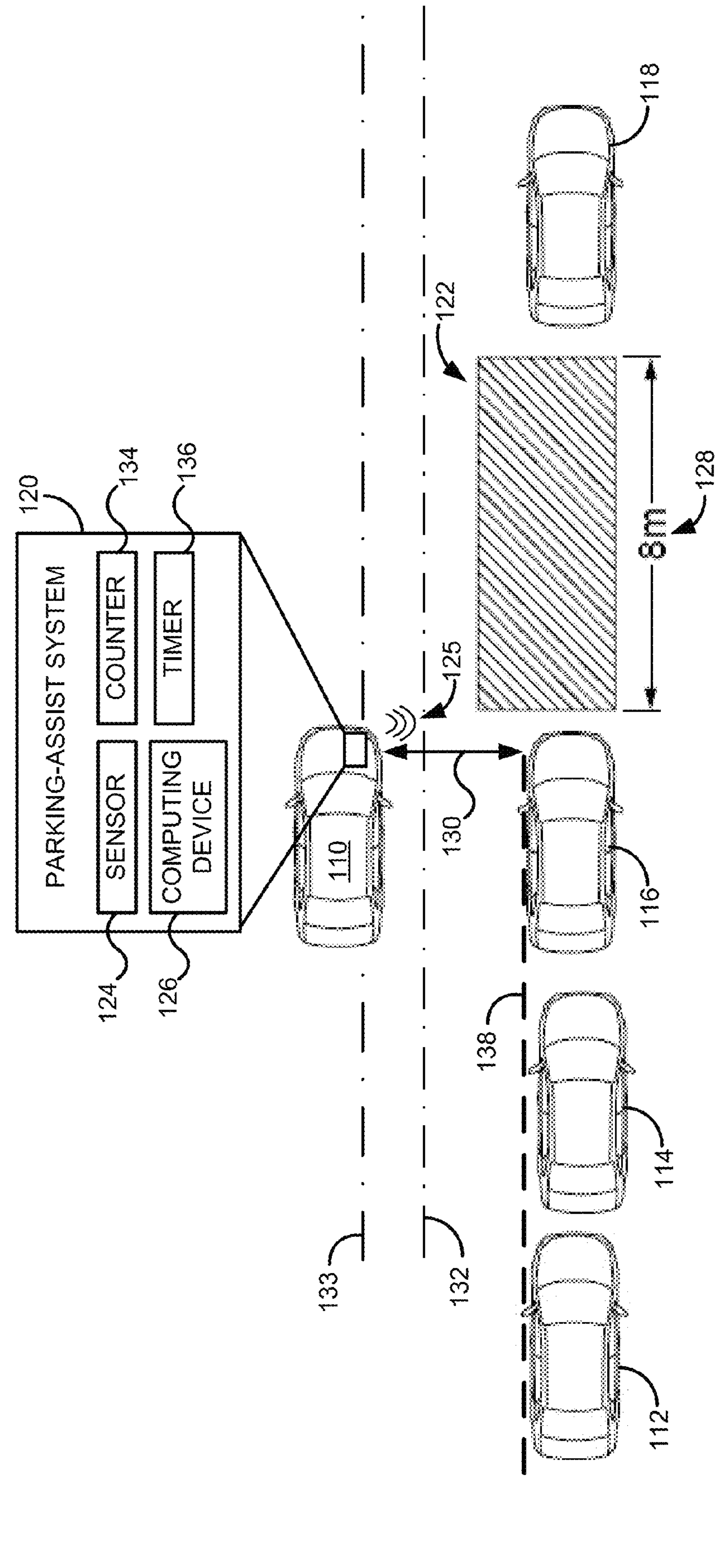
FIG. 1 depicts a birds-eye view of a parking environment in accordance with an embodiment of the present invention.

Having generally described some embodiments of the present invention, reference is now made to FIG. 1 to describe other aspects of the invention. FIG. 1 depicts a birds-eye view of a driven vehicle 110 and several parked vehicles 112, 114, 116, and 118. The driven vehicle includes a parking-assist system 120 configured to detect an available parking slot 122.

The parking-assist system 120 is depicted in an expanded view for illustrative purposes and includes various components, which are leveraged to detect an available parking slot 122. As depicted, the parking-assist system 120 includes a sensor 124, a computing device 126 (e.g., processor, memory, and the like), a counter 134, and a timer 136. The parking-assist system 120 might include more or fewer components and the sensor 124, computing device 126, counter 134, and timer 134, are shown for exemplary purposes. Other components might include a presentation device (e.g., speaker, LED indicator, display screen, and the like) used to render alerts.

In one embodiment, the parking-assist system 120 emits one or more signals 125 that are reflected off of the parked vehicles 112, 114, 116, and 118 as the driven vehicle 110 passes. The sensor 124 of the parking-assist system 120 receives reflected signals, which are used by a computing device 126 of the parking-assist system 120 to assess the parked vehicles. For example, the parking-assist system might use the reflected signals to determine respective positions of parked cars 116 and 118 and estimate a size 128 of the parking slot 122 based on the respective positions.

As indicated in other portions of this description, the parking-assist system 120 can be less reliable based on the distance 130 between the driven vehicle 110 and the parked vehicles 116 and 118. For example, if the distance 130 exceeds a maximum distance 133 for which the sensor 124 can reliably detect any vehicles, then the parking-assist system 120 might not accurately detect the parked vehicles or the parking slot 122. As such, an embodiment of the present invention includes receiving one or more signals 125 which are used to calculate a distance 130 of the driven vehicle 110 from a parked vehicle. The distance 130 is then compared to a distance threshold 132 to determine whether it is recommended that the driven vehicle 110 be driven closer to the parked vehicles. When the distance 130 exceeds the distance threshold 132, a notification is transmitted indicating that the distance threshold is exceeded. For example, the notification might be transmitted to a presentation device of the parking-assistance system.

The distance threshold 132 might be determined in various manners and is set at a distance that is less than the maximum distance 133. Setting the distance threshold 132 less than the maximum distance 133 allows an alert to be generated before the driven vehicle 110 moves passed the maximum distance 133. In one embodiment, the distance threshold 132 is in a range between about 1 meter and about 2 meters.

The distance 130 might be calculated in various manners. In one embodiment, the distance 130 includes a distance of a single vehicle, such as parked vehicle 116. As such, the distance 130 might be calculated for each parked car that is passed by the driven vehicle 110. In another embodiment, the distance 130 includes an average distance 138 based on a minimum quantity of detected parked cars. As such, the parking-assist system 120 includes a counting device 134 that is set to one when a first car is detected, such as 112. The counting device 134 increases the vehicle count when another vehicle is detected within a threshold distance of the previous car, and a running average distance is calculated. The distance between detected parked vehicles might be calculated using various techniques. For instance, a timer 136 might be started when the end of a first vehicle is detected and stopped when the beginning of an adjacent vehicle is detected. The elapsed time might be combined with the driven vehicle speed to estimate the distance between the first vehicle and the second vehicle. If a subsequent vehicle is not detected within the threshold distance of the previous vehicle, then the counter is reset to zero until a subsequent vehicle is detected.

Figure 2:
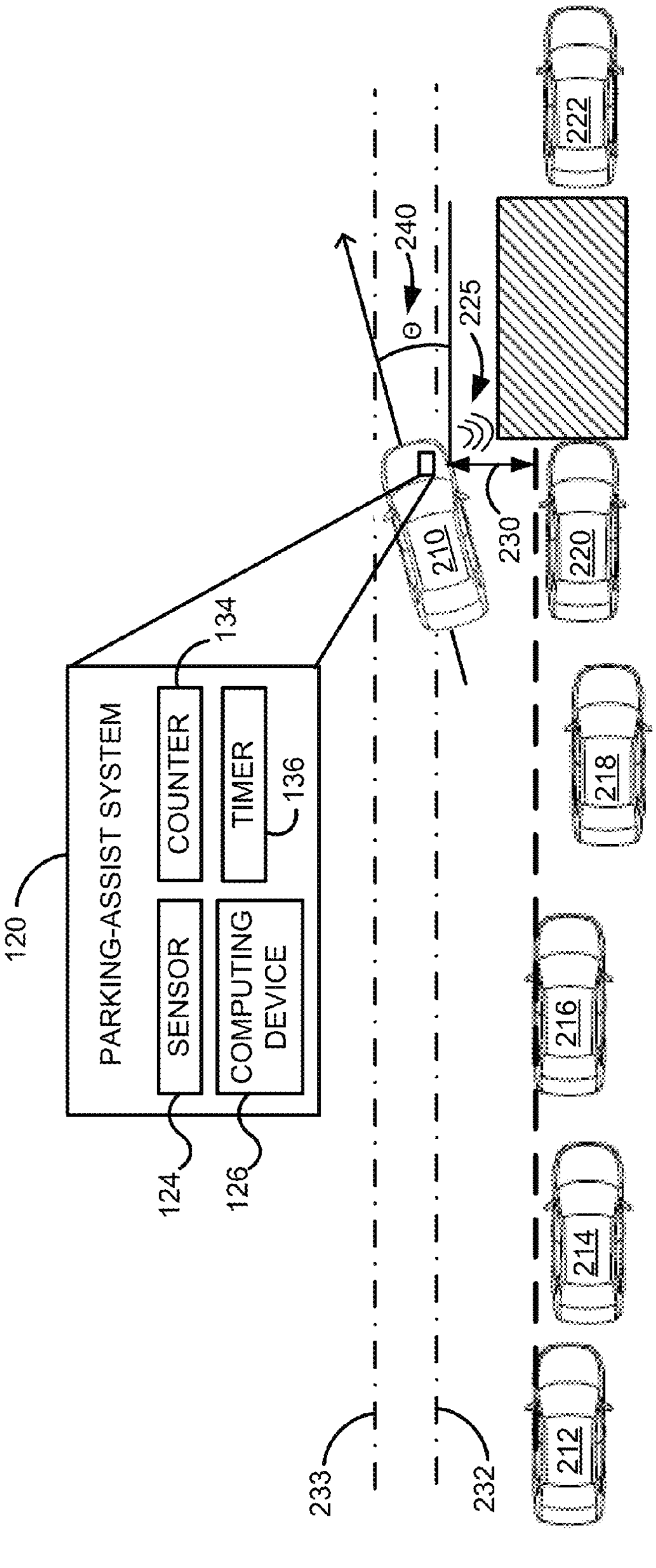
FIG. 2 depicts a birds-eye view of another parking environment in accordance with an embodiment of the present invention.

Reference is now made to FIG. 2 to describe another embodiment of the present invention. FIG. 2 depicts a birds-eye view of another parking environment in which a driven vehicle 210 is depicted together with various parked cars 212, 214, 216, 218, 220, and 222. Similar to FIG. 1, the driven vehicle 210 includes a parking-assistance system 120. In addition, FIG. 2 depicts a threshold distance 232 and a max distance 233. An average distance 230 between the driven vehicle 210 and the parked vehicles is depicted as an arrow and is depicted as less than the threshold distance 232.

FIG. 2 depicts a passing angle 240 of the driven vehicle 210 that includes an angle between a travel path of the driven vehicle 210 relative to one or more parked cars. A passing angle might be determined in various manners. For instance, the parking-assist system 120 might interpret signals 225 received by the sensor 124 to calculate a passing angle. In addition, a motion of a steering wheel might be measured to determine a passing angle, as well as an angle at which vehicle tires are turned. In one embodiment, a passing-angle output is obtained from a dead-reckoning module.

The passing angle 240 is such that, if the driven vehicle 210 continues at the passing angle 240, then a subsequent parked vehicle 222 might not be accurately sensed by the parking-assistance system 120. As such, an embodiment of the present invention includes comparing the passing angle 240 to a threshold passing angle. In one embodiment the threshold angle includes an angle at least about 5 degrees. If the threshold passing angle is exceeded, a notification is transmitted indicating that the threshold is exceeded. For example, the notification might be transmitted to a presentation device of the parking-assistance system. An alert can then be provided to the driver suggesting that the passing angle be reduced, thereby providing adequate time for the travel path of the driven vehicle 210 to be adjusted in a manner that will allow the subsequent parked vehicle 222 to be accurately sensed.

Embodiments of the present invention might include various types of subject matter, such as a device, a system, a method, and the like. For instance, one embodiment includes a parking-assist device for detecting an available parking slot for a vehicle. The device includes various components, such as a sensor, a computing device, and a presentation device. The parking-assist device might also include a counter and a timer. The parking-assist device is configured or programmed to perform functions that assist with detecting an available parking slot. For example, the computing device includes a processing device that is coupled to memory and that retrieves data from the memory to perform specified operations.

Figure 3:
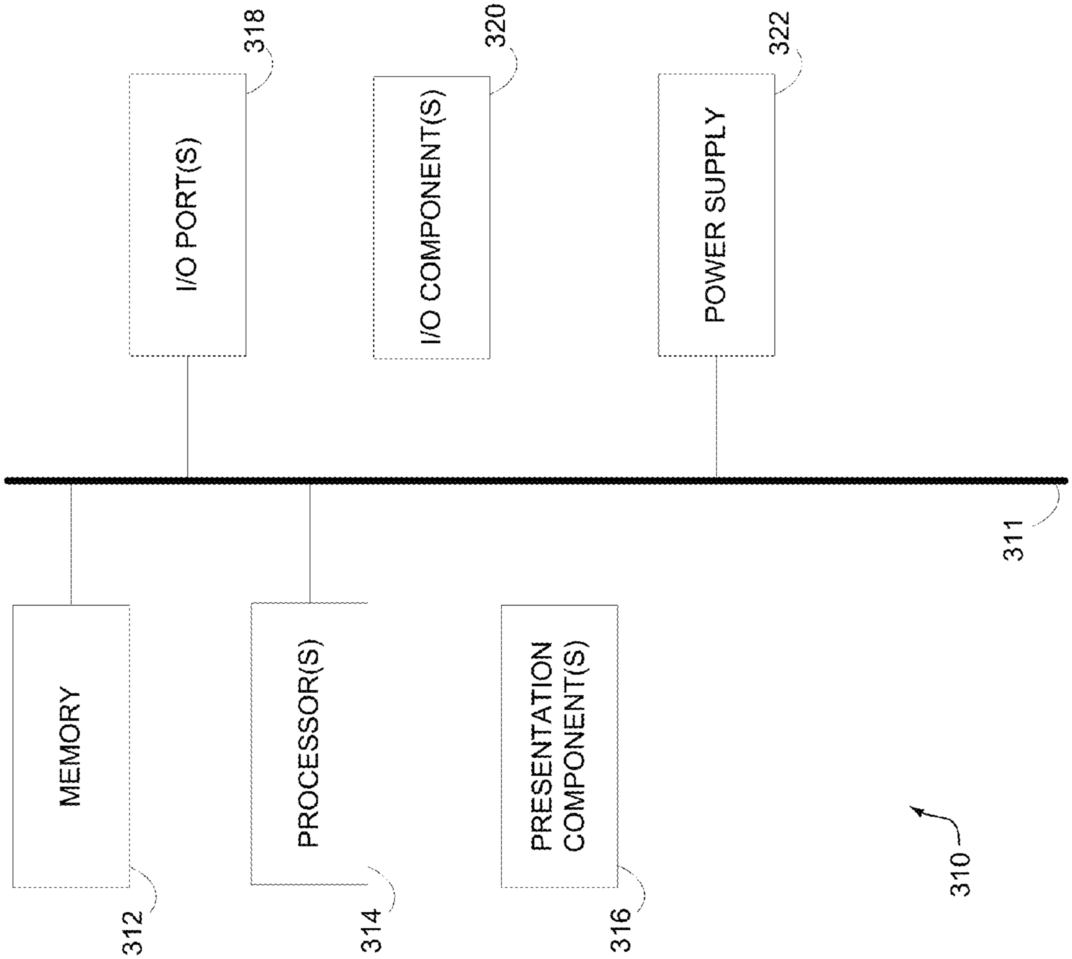
FIG. 3 depicts an exemplary computing environment in accordance with an embodiment of the present invention.

Referring now to FIG. 3, an exemplary computing device 310 is provided in accordance with an embodiment of the present invention. Computing device 310 is but one example of a suitable computing environment and is not intended to suggest any limitation as to the scope of use or functionality of invention embodiments. Neither should the computing environment 100 be interpreted as having any dependency or requirement relating to any one or combination of components illustrated.

Embodiments of the invention may be described in the general context of computer code or machine-useable instructions, including computer-executable instructions such as program modules, being executed by a computer or other machine, such as a personal data assistant or other handheld device. Generally, program modules including routines, programs, objects, components, data structures, etc., refer to code that perform particular tasks or implement particular abstract data types. Examples of this code content or instructions include the operations described as being performed by the parking-assistance device 120, such as calculating a movement parameter (e.g., distance or passing angle) and comparing the movement parameter to a threshold.

With reference to FIG. 3, computing device 310 includes a bus 311 that directly or indirectly couples the following devices: memory 312, one or more processors 312, one or more presentation components 316, input/output ports 318, input/output components 320, and an illustrative power supply 322. Bus 311 represents what may be one or more busses (such as an address bus, data bus, or combination thereof). Although the various blocks of FIG. 3 are shown with lines for the sake of clarity, in reality, delineating various components is not so clear, and metaphorically, the lines would more accurately be grey and fuzzy. For example, one may consider a presentation component such as a display device to be an I/O component. Also, processors have memory. Such is the nature of the art, and it is thus reiterated that the diagram of FIG. 3 is merely illustrative of an exemplary computing device that can be used in connection with one or more embodiments of the present invention.

Computing device 310 might include a variety of computer-readable media. By way of example, and not limitation, computer-readable media might include Random Access Memory (RAM); Read Only Memory (ROM); Electronically Erasable Programmable Read Only Memory (EEPROM); flash memory or other memory technologies; CDROM, digital versatile disks (DVD) or other optical or holographic media; magnetic cassettes, magnetic tape, magnetic disk storage or other magnetic storage devices, or any other memory device that can be used to store desired information and be accessed by computing device 310.

Memory 312 includes computer-storage media in the form of volatile and/or nonvolatile memory. The memory may be removable, nonremovable, or a combination thereof. Exemplary hardware devices include solid-state memory, hard drives, optical-disc drives, etc. Computing device 310 includes one or more processors that read data from various entities such as memory 312 or I/O components 320. Presentation component(s) 316 present data indications to a user or other device. Exemplary presentation components include a display device, speaker, vibrating component, LED indictor light, and the like. I/O ports 318 allow computing device 310 to be logically coupled to other devices including I/O components 320, some of which may be built in.

Figure 4:
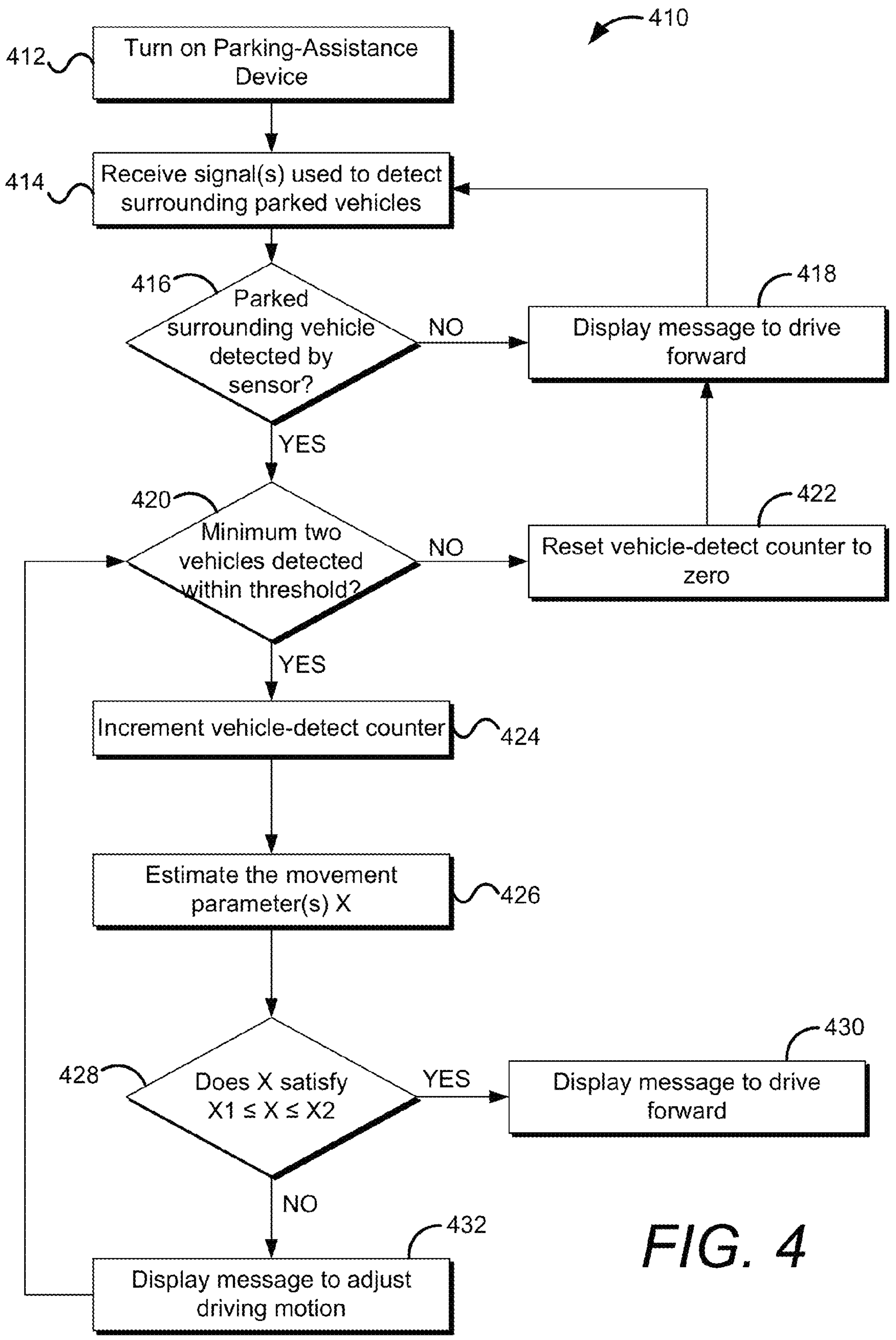
FIG. 4 depicts a flow diagram having various steps that are carried out in accordance with an embodiment of the present invention.

Referring now to FIG. 4, a flow diagram is depicted that includes a series of steps that are carried out in accordance with embodiments of the present invention. As such, the invention might include at least part of method 410 or computer-readable media storing instructions that, when executed, perform at least part of the method 410.

The method 410 includes turning on the parking-assist device at step 412. For example, the parking-assist device might receive an "ON" input from a driver (or other passenger). Step 414 includes receiving signals that are used to detect parked vehicles. For example, the sensor 124 receives signals (e.g., 125 and 225) that are used to detect parked cars.

Step 416 represents a decision depending on whether one or more surrounding parked cars have been detected. If no surrounding parked cars have been detected, then the method 410 proceeds to step 418 at which a notification is provided to drive forward, and the method 410 repeats step 414. If a surrounding parked car has been detected, then the method 410 proceeds to step 420, which represents a decision depending on whether at least two vehicles have been detected within a threshold distance of one another. For example, a counter is started. If at least two vehicles have not been detected, then the method 410 proceeds to step 422 at which a counter is reset to zero, a notification is provided to drive forward, and the method repeats step 414. But if at least two vehicles have been detected, then the method 410 proceeds to step 424 at which the counter is incremented. In this respect, detecting at least two vehicles within a threshold distance of one another is a condition for moving forward with the algorithm.

After incrementing the counter, step 426 includes obtaining a movement parameter. For instance, a distance of the driven vehicle from the parked cars might be calculated. Or a passing angle of the driven vehicle might be retrieved from a dead-reckoning module. Method 410 proceeds to step 428, which represents another decision based on whether the movement parameter satisfies a movement-parameter threshold.

In an embodiment of the present invention, the movement-parameter threshold includes a distance threshold having a tunable range of distances (e.g., between X1 and X2), which depend on various factors. For example, some detection technologies and sensors accurately detect objects at distances that are farther than other detection technologies. As such, the threshold range might depend, at least in part, on the detection technology employed by the parking-assist system. Other relevant factors include environment conditions, such as air temperature. For instance, some ultrasonic sensors detect objects at about 1.5 meters in high-heat environments and 2 meters in lower-heat environments, but some ultrasonic sense as high as 4 meters. In addition, other sensors, such as video (e.g., camera) and radar might provide readings as far as 10 meters or more. These sensors might even be used in combination. As such, step 428 might include determining whether the movement parameter (e.g., passing distance) falls within a range of a tunable threshold minimum and a tunable threshold maximum.

In other embodiments, the movement-parameter threshold includes a passing-angle threshold, which is used to determine wether to suggest changing a driving motion. For instance, a passing threshold of about five degrees might be applied to determine whether to change a driving motion.

If the movement-parameter threshold is satisfied, then a message is provided to drive forward at step 430. But if the movement-parameter threshold is not satisfied, then a message or alert is triggered to adjust a driving motion at step 432. For example, the message might suggest moving closer to the parked cars or reducing a passing angle. In one embodiment, the movement parameter estimated at step 426 includes the distance of the vehicle from the parked cars, and satisfaction of the movement-parameter threshold is a condition to calculating the passing angle.

Many different arrangements of the various components depicted, as well as components not shown, are possible without departing from the scope of the claims below. Embodiments of our technology have been described with the intent to be illustrative rather than restrictive. Alternative embodiments will become apparent to readers of this disclosure after and because of reading it. Alternative means of implementing the aforementioned can be completed without departing from the scope of the claims below. Certain features and subcombinations are of utility and may be employed without reference to other features and subcombinations and are contemplated within the scope of the claims.

The invention claimed is:

1. A non-transitory computer-readable media storing computer-executable instructions that, when executed, provide a method of assessing whether motion of a vehicle is conducive to detecting an available parking slot, the method comprising:

receiving signals usable to calculate a distance of the vehicle from first and second objects;

starting a counter when said first object is detected at a first position using the signals;

determining whether the distance exceeds a first distance threshold;

determining whether a second object is detected within a second threshold distance from the first position; and transmitting a notification when the first distance threshold is exceeded indicating that the distance threshold is exceeded, wherein the distance of the vehicle from the objects is calculated when the second object is detected within the second threshold distance, and wherein the counter is reset to zero when the second object is not detected within the second threshold distance, such that calculating the distance of the vehicle from the objects is conditioned on satisfaction of the second threshold.

2. The non-transitory computer-readable media of claim 1, wherein the signal includes an ultrasonic signal.

3. The non-transitory computer-readable media of claim 1, wherein the first distance threshold is in a range of about one meter to about two meters.

4. The non-transitory computer-readable media of claim 1, wherein the notification triggers an alert, which suggests that the vehicle be driven closer to the one or more objects.

5. The non-transitory computer-readable media of claim 1, wherein relative positions of the first object and the second object are used to calculate the distance.

6. The non-transitory computer-readable media of claim 5, wherein the distance includes an average of distances measured between the vehicle and the first object and the second object.

7. A parking-assistance device for detecting an available parking slot for a vehicle comprising:

a sensor that receives signals;

a computing device configured to:

calculate a movement parameter that is based on the one or more signals and that describes a state of the vehicle respective to one or more objects, compare the movement parameter to a movement-parameter threshold, and transmit a notification when the movement parameter fails to satisfy the movement-parameter threshold;

a presentation device that receives the notification and provides an alert suggesting that the state of the vehicle be changed; and a counter that is started when a first object is detected at a first position using the signals generated by the sensor, said computing device further determining whether a second object is detected within a second threshold distance from the first position, wherein the distance of the vehicle from the one or more objects is calculated when the second object is detected within the second threshold distance, and wherein the counter is reset to zero when the second object is not detected within the second threshold distance, such that calculating the distance of the vehicle from the one or more objects is conditioned on satisfaction of the second threshold.

8. The device of claim 7, wherein the sensor includes an ultrasonic sensor.

9. The device of claim 7, wherein the movement parameter includes a distance between the vehicle and the one or more objects.

10. The device of claim 9, wherein the distance is an average of distances measured between the vehicle and the one or more objects.

11. The device of claim 9, wherein the movement threshold is a distance threshold in a range of about 1 meter to about 2 meters, and wherein the distance fails to satisfy the distance threshold when the distance exceeds the distance threshold.

12. The device of claim 9, wherein the alert suggests that the vehicle be driven closer to the one or more objects.

13. The device of claim 7, wherein the movement parameter includes an angle of a path along which the vehicle is moving relative to the one or more objects.

14. The device of claim 13, wherein the movement-parameter threshold at least about five degrees, and wherein the angle fails to satisfy the movement-parameter threshold when the angle exceeds the movement-parameter threshold.

* * * * *